United States Patent [19]
Byrnes et al.

[11] Patent Number: 5,940,791
[45] Date of Patent: Aug. 17, 1999

[54] METHOD AND APPARATUS FOR SPEECH ANALYSIS AND SYNTHESIS USING LATTICE LADDER NOTCH FILTERS

[75] Inventors: Christopher I. Byrnes, Clayton, Mo.; Anders Lindquist, Täby, Sweden

[73] Assignee: Washington University, St. Louis, Mich.

[21] Appl. No.: 08/854,150

[22] Filed: May 9, 1997

[51] Int. Cl.[6] ........................................................ G10L 7/02
[52] U.S. Cl. ........................................... 704/219; 704/258
[58] Field of Search .................................... 704/258, 500, 704/219

[56] References Cited

U.S. PATENT DOCUMENTS

| | | |
|---|---|---|
| 2,151,091 | 3/1939 | Dudley . |
| 2,243,526 | 5/1941 | Dudley . |
| 4,209,836 | 6/1980 | Wiggins, Jr. et al. . |
| 4,344,148 | 8/1982 | Brantingham et al. .................. 364/724 |
| 4,775,951 | 10/1988 | Iwahashi et al. . |
| 4,827,518 | 5/1989 | Feustel et al. ............................. 381/42 |
| 4,837,830 | 6/1989 | Wrench, Jr. et al. ..................... 381/42 |
| 5,048,088 | 9/1991 | Taguchi . |
| 5,293,448 | 3/1994 | Honda . |

OTHER PUBLICATIONS

Bellanger, "Computational Complexity and Accuracy Issues in Fast Least Squares Algorithms for Adaptive Filtering" ISCAS ' 88, pp. 2635–2639, 1988.
Deller, Discrete–Time Processing of Speech Signals, Prentice Hall, pp. 480 and 481, 1987.
Deller et al "Discrete–time processing of speech signals" Prentice Hall, p. 459, 1987.
Manolakis, "A ladder–latice structure for multipulse linear predictive coding of speech" IEEE pp. 228–231, 1987.
K.J. Åström, Introduction to stochastic realization theory, Academic Press (1970).
K.J. Åström, Evaluation of quadratic loss functions for linear systems, in Fundamentals of Discrete–time systems: A tribute to Professor Eliahu I. Jury, M. Jamshidi, M. Mansour, and B.D.O. Anderson (editors), IITSI Press, Albuquerque, New Mexico (1993) pp. 45–56.
T.P. Barnwell III, K. Nayebi and C.H. Richardson, Speech Coding: A computer Laboratory Textbook, John Wiley & Sons, New York, (1996).
C.G. Bell, H. Fujisake, J.M. Heinz, K.N. Stevens and A.S. House, Reduction of Speech Spectra by Analysis–by–Synthesis Techniques, J. Acoust. Soc. Am. 33 (1961) pp. 1725–1736.
C.I. Byrnes, S.V. Gusev and A. Lindquist, A convex optimization approach to the rational covariance extension problem, private document.
T. Kailath, Linear Systems, Prentice Hall, N.J. (1980) pp. 93–94, 363–65.

(List continued on next page.)

Primary Examiner—David R. Hudspeth
Assistant Examiner—Harold Zintel
Attorney, Agent, or Firm—Howell & Haferkamp, L.C.

[57] ABSTRACT

A method and apparatus for analyzing and synthesizing speech includes a programmable lattice-ladder notch filter which may be programmed to exhibit both filter poles and filter zeros and thereby exhibit a power spectral density with a better fit to that of a speech frame such that, when energized by a selected signal sample, a more accurate regeneration of speech is achieved. The filter parameters may be reliably and systematically determined as a single solution to a mathematical analysis given a set of gain parameters matching the observed covariance data and having a prescribed set of transmission zeros. These transmission zeros may either be preselected as a design specification, or recovered from analysis of the speech data. A speech frame may be analyzed and provide a set of parameters which may be transmitted to a remote location where a synthesizer may accurately reproduce the speech frame.

32 Claims, 3 Drawing Sheets

OTHER PUBLICATIONS

T.T. Georgiou, Realization of Power Spectra from Partial Covariance Sequences, IEEE Trans. on Acoustics, Speech and Signal Processing, vol. ASSP–35, No. 4 (1987) pp. 438–449.

C.I. Byrnes, H.J. Landau and A. Lindquist, On the well–posedness of the rational convariance extension problem in *Current and Future Directions in Applied Mathematics,* M. Alber, B. Hu and J. Rosenthal (editors), Birkhäuser Boston (1997), pp. 83–108.

C.I. Byrnes and A. Lindquist, An algebraic description of the rational solutions of the covariance extension problem, in Linear Circuits, Systems and Signal Processing, C.I. Byrnes, C.F. Martin and R.E. Saeks (editors), Elsevier (1988), pp. 9–17.

C.I. Byrnes and A. Lindquist, On the geometry of the Kimura–Georgiou parameterization of modelling filter, Inter. J. of Control 50 (1989) pp. 2301–2312.

C.I. Byrnes and A. Lindquist, Toward a solution of the minimal partial stochastic realization problem, Comptes Rendus Acad. Sci. Paris. t. 319 (1989) pp. 2301–2312.

C.I. Byrnes and A. Lindquist, Some recent advances on the rational covariance extension problem, Proc. IEEE European Workshop on Computer Intensive Methods in Control and Signal Processing, Prague (1994), pp. 149–158.

C.I. Byrnes and A. Lindquist, On the partial stochastic realization problem, IEEE Trans. Automatic Control AC–42 (1997), to appear.

C.I. Byrnes and A. Lindquist, On a duality between filtering and interpolation, System and Control in the 21st Century, pp. 101–136.

C.I. Byrnes, A. Lindquist, S.V. Gusev and A.V. Matveeve, The geometry and positive real functions with applications to the rational covariance extension problem, Proc. 33rd Conf. on Decision and Control, 3883–3888.

C.I. Byrnes, A. Lindquist, S.V. Gusev and A.V. Matveeve, A complete parameterization of all positive rational extensions of a covariance sequence, IEEE Trans. Automatic Control AC–40 (1995), pp. 1841–1857.

C.I. Byrnes, A. Lindquist, and T. McGregor, Predictability and unpredictability in Kalman filtering, IEEE Transactions Auto. Control AC–36 (1991), pp. 563–579.

C.I. Byrnes, A. Lindquist, and Y. Zhou, Stable, unstable and center manifolds for fast filtering algorithms, Modeling, Estimation and Control of Systems with Uncertainty (G.B. Di Masi, A. Gombani, and A. Kurzhanski, eds.), Birkhauser Boston, Inc. (1991).

C.I. Byrnes, A. Lindquist, and Y. Zhou, On the nonlinear dynamics of fast filtering algorthms, SIAM J. Control and Optimization, 32 (1994) pp. 744–789.

L.O. Chau, C.A. Desoer and E.S. Kuh, *Linear and Nonlinear Circuits,* McGraw–Hill (1989).

G. Heinig, P. Jankowski and K. Rost, Fast Inversion Algorithms of Toeplitz–plus–Hankel Matrices Numerische Mathematik 52 (1988)j pp. 665–682.

W.B. Kleijn, D.J. Krasinski and R.H. Ketchum, Fast methods for the CELP speech coding algorithm, IEEE Trans. Acoustics, Speech, and Signal Processing 38 (1990), pp. 1330–1332.

D.G. Luenberger, *Linear and Nonlinear Programming* (Second Edition), Addison–Wesley Publishing Company, Reading, Mass. (1984).

J.D. Markel and A.H. Gray, *Linear Prediction of Speech,* Springer Verlag, Berlin (1976).

M. Minoux, *Mathematical Programming: Theory and Algorithms,* John Wiley and Sons, New York (1986), pp. 94–95.

B. Porat, *Digital Processing of Random Signals,* Prentice Hall (1994).

D. Quarmby, *Signal Processing Chips,* Prentice Hall (1994).

L.R. Rabiner, B.S. Atal, and J.L. Flanagan, *Current methods of digital speech processing,* Selected Topics in Signal Process (S. Haykin, editor), Prentice Hall (1989), pp. 112–132.

L.R. Rabiner and R.W. Schafer, *Digital Processing of Speech Signals,* Prentice Hall, Engelwood Cliffs, N.J. (1978).

Vostry, Zdnek, *New Algorithm For Polynomial Spectral Factorization with Quadratic Convergence I,* Kybernetica 77 (1975).

TR45 Full–Rate Speech Codec Compatibility Standard PN–2972, Electroic Industries Association, 2001 Eye Street N.W., Washington, D.C. 20006 (1990).

F.J. Taylor, Digital Filter Design Handbook, Prentice Hall, N.J. (1994) pp. 340–347.

METHOD AND APPARATUS FOR SPEECH ANALYSIS AND SYNTHESIS USING LATTICE LADDER NOTCH FILTERS

BACKGROUND OF THE INVENTION

In speech synthesis, the speech pattern is usually divided into frames of a few tens of ms. Conventional vocoders identify stationary speech phonemes into voiced and unvoiced speech (see, e.g., U.S. Pat. Nos. 2,151,091 and 2,243,526). In the art, a single phoneme is regarded to evolve on the order of magnitude of 100 ms. On each of the smaller windows, a linear filter—or digital circuit—is then designed to model the vocal tract. A voiced speech signal can be modeled, and regenerated, as a deterministic process obtained by passing a quasi-periodic signal containing the appropriate pitch frequencies through a linear filter. Analogously, an unvoiced speech signal is modeled, and regenerated, as a random signal obtained by passing white noise through the same linear filter, which models the vocal chords. In this time frame, the parameters characterizing the linear filter as an input/output device are identified using, for example, methods from linear prediction coding (LPC) filter design, and encoded for regeneration. For applications in cellular telephone communications using pitch-excited vocoders, in this same window, the speech pattern is segmented into an identified sequence, also encoded for regeneration, of voiced and unvoiced phonemes. In some popular forms of vocoders, for each unvoiced expression a code book, or look-up table, of white noise signals is searched for that signal which, when passed through the LPC filter, regenerated the response closest to the sampled unvoiced signal. The code for this signal is then transmitted for regeneration. A similar procedure is performed for voiced signals with a periodic pulse train signals in lieu of white noise. Here, however, the vocoder must also perform pitch detection in order to regenerate the voiced signal.

Linear Predictive Coding (LPC) can be used in a variety of different speech coders, such as pitch-excited vocoders, voice-excited vocoders, waveform coders, analysis-by-synthesis coders, and frequency-domain coders (see T. P. Barnwell III, K. Nayebi and C. H. Richardson, *Speech Coding: A Computer Laboratory Textbook,* John Wiley & Sons, New York, 1996, at 85), and the invention disclosed herein can be used in all these contexts and is not confined to a particular vocoder architecture. In fact, LPC filters, sometimes referred to as maximum entropy filters, in devices for such digital signal processing and speech synthesis (see, e.g., U.S. Pat. Nos. 4,209,836 and 5,048,088; D. Quarmby, *Signal Processing Chips,* Prentice Hall, 1994; and L. R. Rabiner, B. S. Atal, and J. L. Flanagan, *Current Methods of Digital Speech Processing,* Selected Topics in Signal Processing, S. Haykin, editor, Prentice Hall, 1989, 112–32) have been used in the prior art.

The circuit, or integrated circuit device, which implements the LPC filter is designed and fabricated using ordinary skill in the art of electronics (see, e.g., U.S. Pat. Nos. 4,209,836 and 5,048,088) on the basis of the specified parameters (specs) which appear as coefficients (linear prediction coefficients) in the mathematical description (transfer function) of the LPC filter. For example, the expression of the specified parameters (specs) is often conveniently displayed in the lattice filter representation of the circuit shown in FIG. 1, containing unit delays $z^{-1}$, summing junctions, and gains.

This is also known as a PARCOR system. The gain (PARCOR) parameters, which are also the reflection coefficients of the random signal (as in FIG. 1), are easily determined from the speech waveform. The design of the associated circuit is immediate with ordinary skill in the art of electronics. In fact, this filter design has been fabricated by Texas Instruments, starting from the lattice filter representation, and is used in the LPC speech synthesizer chips TMS 5100, 5200, 5220 (see, e.g., Quarmby, *Signal Processing Chips,* supra, at 27–29).

The two advantages of LPC filter design are that it is possible to find parameter specs so that the LPC filter produces a signal which reproduces much of the observed spectral properties, and that there exists algorithms for finding the filter parameters from the spectral properties of the observed speech form. FIG. 2 shows a periodogram determined from a frame of speech data together with the power spectral density of a 6th order LPC filter designed from this frame.

A disadvantage of the LPC filter is that its power spectral density cannot match the "valleys," or "notches," in the periodogram and results in speech which is rather "flat," reflecting the fact that the LPC filter is an "all-pole model." This is related to the technical fact that the LPC filter only has poles and has no transmission zeros. To say that a filter has a transmission zero at a frequency $\zeta$ is to say the filter, or corresponding circuit, will absorb damped periodic signals which oscillate at a frequency equal to the phase of $\zeta$ and with a damping factor equal to the modulus of $\zeta$. This is the well-known blocking property of transmission zeros of circuits (see, e.g., L. O. Chua, C. A. Desoer and E. S. Kuh, *Linear and Nonlinear Circuits,* McGraw-Hill, 1989, at 659). This-technical fact is reflected-in-the fact, illustrated in FIG. 2, that the power spectral density of the LPC filter will not match the periodogram at frequencies near its notches. It is also widely appreciated in the signal and speech processing literature that regeneration of human speech requires the design of filters having zeros, without which the speech will sound flat or artificial (see, e.g., C. G. Bell, H. Fujisaki, J. M. Heinz, K. N. Stevens and A. S. House, *Reduction of Speech Spectra by Analysis-by-Synthesis Techniques,* J. Acoust. Soc. Am. 33 (1961), at 1726; J. D. Markel and A. H. Gray, *Linear Prediction of Speech,* Springer Verlag, Berlin, 1976, at 271–72; L. R. Rabiner and R. W. Schafer, *Digital Processing of Speech Signals,* Prentice Hall, Englewood Cliffs, N.J., 1978, at 105 and 76–78). Indeed, while all-pole filters can reproduce much of human speech sounds, the acoustic theory teaches that nasals and fricatives require both zeros and poles (see, Markel et al., *Linear Prediction of Speech,* supra, at 271–72; Rabiner et al., *Digital Processing of Speech Signals,* supra, at 105).

This observation is a partial motivation for the device disclosed in U.S. Pat. No. 5,293,448, in which a zero filter is used as a prefilter to the all pole filter to generate higher quality voiced signals. However, the lack of a clear and useful delineation of the extent to which zeros may be arbitrarily assigned to implementable for linear filters both voiced and unvoiced speech has remained a limiting factor in the design of improved devices for signal and speech processing.

SUMMARY OF THE INVENTION

The present invention comprises a method and device for the systematic design of linear filters having both desired zero structure and the standard spectral features required to regenerate the appropriate voiced and unvoiced signals. The inventors' implementations and tests suggest that the pre-selection of nontrivial zero structure improves the regeneration of human speech. Applying this methodology for filter design to the same speech data and periodogram as in FIG. 2, an alternative 6th order filter is obtained, whose power spectral density is less flat and provides a better approximation, reflecting the fact that the filter is designed to have transmission zeros near the minima of the periodogram (see FIG. 3).

In automatic control, filters having prescribed transmission zeros are referred to as notch filters. Notch filters have been used as dynamic compensators to attenuate stable harmonic fluctuations by achieving desired pole-zero cancellations. Although the desirability of notches in the power spectrum of the filters disclosed in the present invention plays a quite different role for signal processing and speech synthesis than the role played by notch filters in automatic control, the analogy suggests that we refer to the filters disclosed here as LLN filters. This acronym also reflects the lattice-ladder architecture which can be used to implement these filters, as disclosed below. Lattice-ladder architecture representations of various filters occur in prior art, but the lack of either a method or a means of tuning the filter parameters in this representation to match the desired spectral properties and the notches in the spectrum of the speech waveform has prohibited its use in speech processing for high quality speech analysis and synthesis. Such method and means are disclosed herein. We note that an LLN filter is defined, independent of the architecture used to represent it, by the specification of the filter zeros and of the window of covariances computed from the speech frame. The lattice-ladder architecture is the implementation of one particular state-space representation of the LLN filter transfer function, and the theory of linear systems teaches that each such state space representation (which when minimal dimension are all equivalent under a state-space transformation) *Linear Systems,* T. Kailath, Prentice-Hall, N.J. 1980 (pages 363–365) leads directly to an equivalent architecture represented in terms of gains, summing junctions and unit delays (see e.g. Kailath, pages 93–94). For purposes of illustrating the preferred embodiment, we teach the implementation of LLN filters in terms of the lattice ladder architecture. It is also disclosed here that LPC filters, and their representation in a lattice filter architecture, can be obtained as a specialization of the disclosed LLN filter design.

It is widely appreciated in the signal and speech processing community that regeneration of human speech requires the design of filters having zeros. The effect of zeros is to enable the power spectral density to provide a spectral envelope which better fits the speech waveform. For example, this enables the design of a filter which is sensitive to the location of the source of the speech within the vocal tract as well as providing a model encompassing the nasal tract (see, Bell et al., *Reduction of Speech Spectra by Analysis-by-Synthesis Techniques,* supra, at 1726–27; and Markel et al., *Linear Prediction of Speech,* supra, at 271–72). For such reasons, the method and device for the systematic design of linear filters having both desired zero structure and the standard spectral features required to regenerate the appropriate voiced and unvoiced signals has application in the area of high quality speech synthesis.

For the same reasons, this method and design may be used in devices for speech recognition, by providing a device for both developing filter parameters from observed speech and comparing the filter parameters so-obtained with parameters already stored for particular individuals. The LLN filter design disclosed herein uses zeros as well as poles, while the LPC filter is an all-pole filter, and should provide more accurate encoding and identification of human speech.

This method and design has application in speech synthesis for another reason, especially in applications involving the compression and transmission of speech as it occurs, for example, in digital cellular telephone communications. We have already described the use of LPC filters in speech synthesis in a pitch-excited vocoder environment and noted the need for filters, such-as LLN filters, which both have desired transmission zeros and match the covariances determined from speech data. LLN filters will enjoy this advantage in use in a variety of other vocoders, such as voice-excited vocoders, waveform vocoders, analysis-by-synthesis vocoders and frequency-domain vocoders. In addition, for speech synthesis using one of the analysis-by-synthesis vocoders, a code-excited linear predictor coder (CELP), a codebook of (typically) 1024 signals, or codewords, is stored and is searched at the transmitting device for the excitation codeword which will best regenerate the observed speech signal. The identification number, or code number, of this signal is then transmitted along with a scaling factor and the LPC gains to the receiving device for regeneration. Currently the most computational, and time, intensive activity during this window is the search through look-up tables to find the best signal with which to reproduce the observed signal using an LPC filter. By using a mare accurate spectral envelope, through the method disclosed herein, for the spectrum of the observed speech waveform, it is expected to be able to reduce the number of candidate signals with which to reproduce the observed signal, thereby shortening the most time-intensive part of the encoding and speech compression activity.

It is expected that this invention will have application as an alternative for the use of LPC filter design in other areas of signal processing and statistical prediction including, for example, speech compression, speech synthesis from stored coded speech, or text-to-speech synthesis. In each of these areas, the same fundamental spectral estimation problem arises.

While the principal advantages and features of the present invention have been briefly explained and illustrated in the foregoing discussion, a greater understanding and appreciation for the various aspects of the invention may be attained by referring to the drawings and the description of the preferred embodiment which follow.

DETAILED DESCRIPTION OF THE PREFERRED EMBODIMENT

Figure 1:
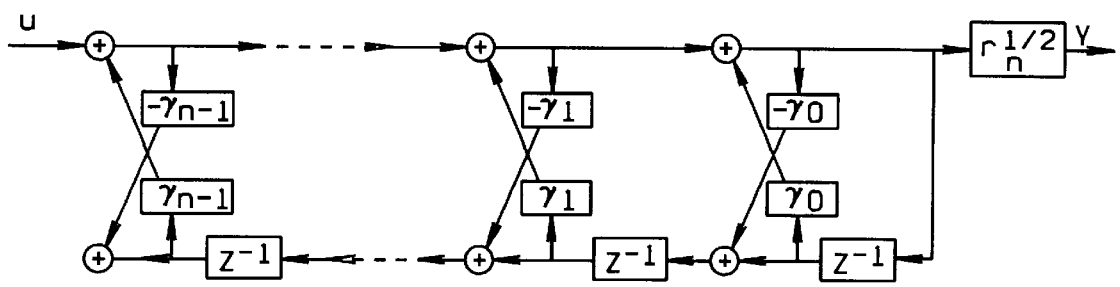
FIG. 1 is a schematic diagram of a lattice representation of an LPC filter as known in the prior art.
Figure 2:
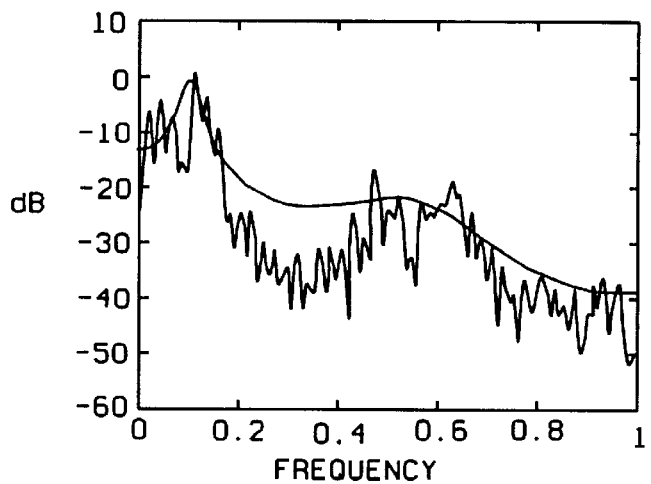
FIG. 2 is a periodogram determined from a frame of speech data together with the power spectral density of a sixth order LPC filter designed from this frame.
Figure 3:
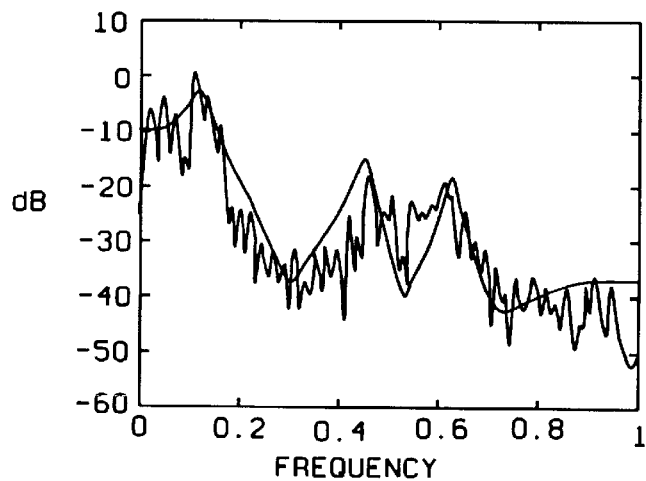
FIG. 3 is the periodogram of FIG. 2 with the power spectral density of an alternative sixth order filter of the present invention.

Conventional vocoders perform three tasks: determining a linear filter which models the vocal tract, determining an appropriate model of the excitation signal, and the regeneration of the observed signal when the excitation signal is generated and used to excite the linear filter. Naturally, tasks such as speech compression and transmission are accomplished by encoding and decoding the filter parameters and the identifying characteristics of the excitation signal within a class of signals. As discussed above, there are standard electronic devices which perform each of these three tasks, both separately and in an integrated form, in a variety of vocoder architectures. Also discussed is the fact that the LPC filter is the most commonly used linear filter in the prior art for modeling the vocal tract. The basic design feature of such a filter is that it produces a synthetic speech signal whose power spectrum matches the first n+1 covariance coefficients $c_0, c_1, C_2, \ldots, C_n$ extracted from the speech data in the window; i.e., besides being stable, the transfer function w(z) of the LPC filter satisfies $$|\omega(e^{j\theta})|^2 = \hat{c}_0 + 2\hat{c}_1 \cos\theta + 2\hat{c}_2 \cos 2\theta + \ldots, \quad (2.1)$$

where $$\hat{c}_k = c_k \text{ for } k=0,1,\ldots,n \quad (2.2)$$

(For example, for unvoiced speech, this means that the LPC circuit produces a random signal, with specified first n+1 covariances $c_0, C_1, \ldots, C_n$, when driven by white noise.) It is this property which makes the LPC filter a decent model of the vocal tract.

However, as pointed out above, the drawback of the LPC filter is that it is an all-pole filter. Atal has pointed out that the perceived differences between real speech and the best synthetic speech obtainable using an LPC filter are at least partially due to the all-pole model restriction (see, Markel et al., *Linear Prediction of Speech,* supra, at 271). The need for introducing zeros has led to many ad hoc methods, but the absence of a systematic design methodology for incorporating appropriate zeros is a limiting factor in high quality speech analysis and synthesis (see, e.g., Markel et al., *Linear Prediction of Speech,* supra, at 271–275). An advantage of the present invention is that it includes a filter which satisfies the same covariance properties (2.1)–(2.2) as the LPC filter, but for which the zeros can be set arbitrarily.

In fact, in this disclosure it is described how to design a filter, and how to implement this filter with a circuit, which will be useful in signal processing and speech synthesis. This shall be referred to as a LLN filter, because it is a notch filter, designed to have prescribed zeros, and can be implemented, for example, using a lattice-ladder architecture, as described in detail below. The circuit meets the following specifications.

(i) For the covariance coefficients $c_0, C_1, C_2, \ldots, C_n$ extracted from the speech data in the window, the (stable) transfer function of the LLN filter satisfies $$|\omega(e^{j\theta})|^2 = \hat{c}_0 + 2\hat{c}_1 \cos\theta + 2\hat{c}_2 \cos 2\theta + \ldots, \quad (2.3)$$

where $$\hat{c}_k c_k \text{ for } k=0,1,\ldots,n. \quad (2.4)$$

(ii) The filter has prescribed zeros, $\zeta_1, \zeta_2, \ldots, \zeta_n$, inside the unit disc.

In specifying the covariance coefficients, we also include equivalent forms of specifying these statistical data, such as the representation of covariance data by PARCOR parameters, reflection coefficients, Schur parameters or their statistical equivalents. In specifying the filter zeros, we also include equivalent forms of specifying zeros, such as the coefficients of the zero polynomial, the zero polynomial or any of their functional equivalents. These, and any other equivalents, would be understood by one of ordinary skill in the art as included within the scope of the invention. For brevity, the inventors shall use the terms covariance and zero, and these terms shall be understood as being broadly defined to include these and other such equivalents.

Figure 4:
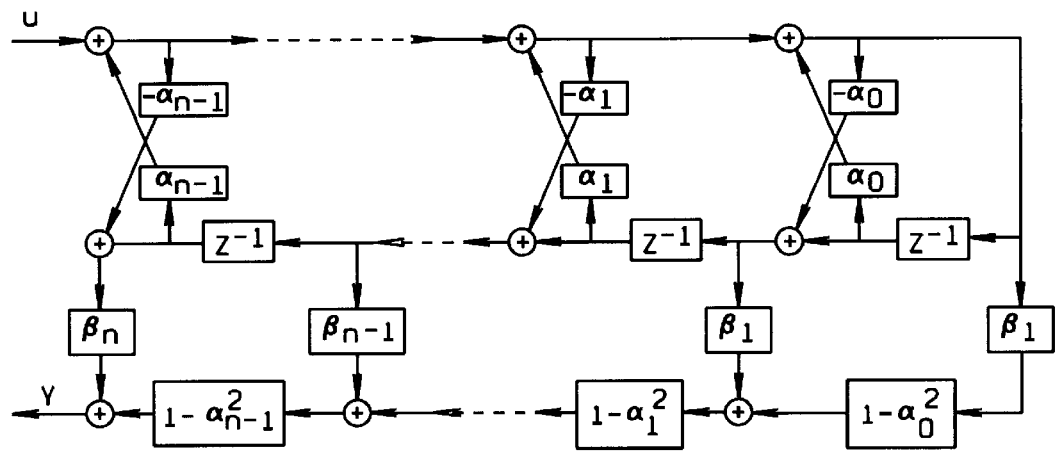
FIG. 4 is a schematic diagram of a lattice- ladder representation the present invention (LLN filter)

When represented in the lattice-ladder architecture, the LLN filter is determined by the parameters shown in FIG. 4. As for the lattice representation of the LPC filter, the LLN filter consists of gains, which are the parameter specs, unit delays $z^{-1}$, and summing junctions and therefore can be easily mapped onto a custom chip or onto any programmable digital signal processor (e.g., the Intel 2920, the TMS 320, or the NEC 7720) using ordinary skill in the art (see, e.g., Quarmby, *Signal Processing Chips,* supra, at 27–29).

It is observed that the lattice-ladder filter representation builds on the lattice filter topology, but provides for the incorporation of the spec parameters denoted by β, which allow for the incorporation of zeros into the filter design. In fact, the lattice filter representation of an all-pole (LPC) filter can be designed from the lattice-ladder filter architecture representing an LLN filter by setting the parameter specifications:

$$\beta_0 = \tau_x^{-\frac{1}{2}}, \beta_1 = \beta_2 = \ldots = \beta_n = 0 \text{ and } \alpha_k = \gamma_k \text{ for } k=0,1,\ldots,n-1.$$

While it has been appreciated that the additional features of the lattice-ladder filter make it possible to design filters with nontrivial zero structure, the limiting factors in this design strategy have been the lack of knowledge as to how arbitrarily one could make the specifications of the filter zeros, how may filters (if any) achieve this design specification, and how to design such filters if they do indeed exist. The first of these questions has been successfully addressed in the literature by T. T. Georgiou, *Realization of Power Spectra from Partial Covariance Sequences,* IEEE Trans. on Acoustics, Speech and Signal Processing, ASSP-35 (1987) 438–449, where it is shown that such filters exist for any choice of zeros (inside the unit disc). The second theoretical issue was resolved in the literature in the publication C. I. Byrnes, A. Lindquist, S. V. Gusev and A. V. Matveev, *A Complete Parameterization of All Positive Rational Extensions of a Covariance Sequence,* IEEE Trans. Automatic Control AC-40 (1995), 1841–1857, where it is also shown that the choice of zeros can be made arbitrarily while maintaining the ability to match the covariance coefficients and that this can be done in only one way, so that the resulting filter is uniquely determined by these design specifications. These theoretical results were purely existence arguments and did not, however, resolve the issue of how to effectively compute the gains an implementable digital filter; for example, in the lattice-ladder representation we propose here. This left the long felt need in the art for a solution to this problem which would permit the design and use of an appropriate filter for speech analysis and synthesis.

The present invention answers the third question and includes a method for prescribing the zeros, so that it is possible to design and implement the unique filter which can produce output signals with the desired spectral properties and a spectral envelope with the desired notches. We also disclose that this filter can be represented in a lattice-ladder architecture and that an efficient algorithm for the computation of the (LLN) filter parameters is disclosed along with a method for determining the filter zeros from observed data. In the present method, the filter poles are completely determined by the observed correlation coefficients (i) and the prescription of transmission zeros (ii). Also disclosed is the fact that the filter poles cannot, in general, be prescribed first, with the zeros then determined by the observed data. This distinguishes the disclosed method and the resulting circuit design and the method and design disclosed in U.S. Pat. No. 5,293,448, wherein a lattice filter representation of a zero filter is tuned to the prior choice of the all-pole (or LPC) filter, represented for example in ladder form. Another advantage of the present invention is in the use of zeros to reproduce unvoiced, as well as voiced, speech.

With the present method and circuit design, it is possible to incorporate the preselection of arbitrary transmission zeros into the design specifications for a (notch) filter which reproduces an approximation for an observed signal when driven by the appropriate excitation signal, and there exists algorithms for finding the filter parameters $$\alpha_0, \alpha_1, \ldots, \alpha_{n-1} \text{ and } \beta_0, \beta_1, \ldots, \beta_n \quad (2.5)$$

from the design specifications.

Figure 5:
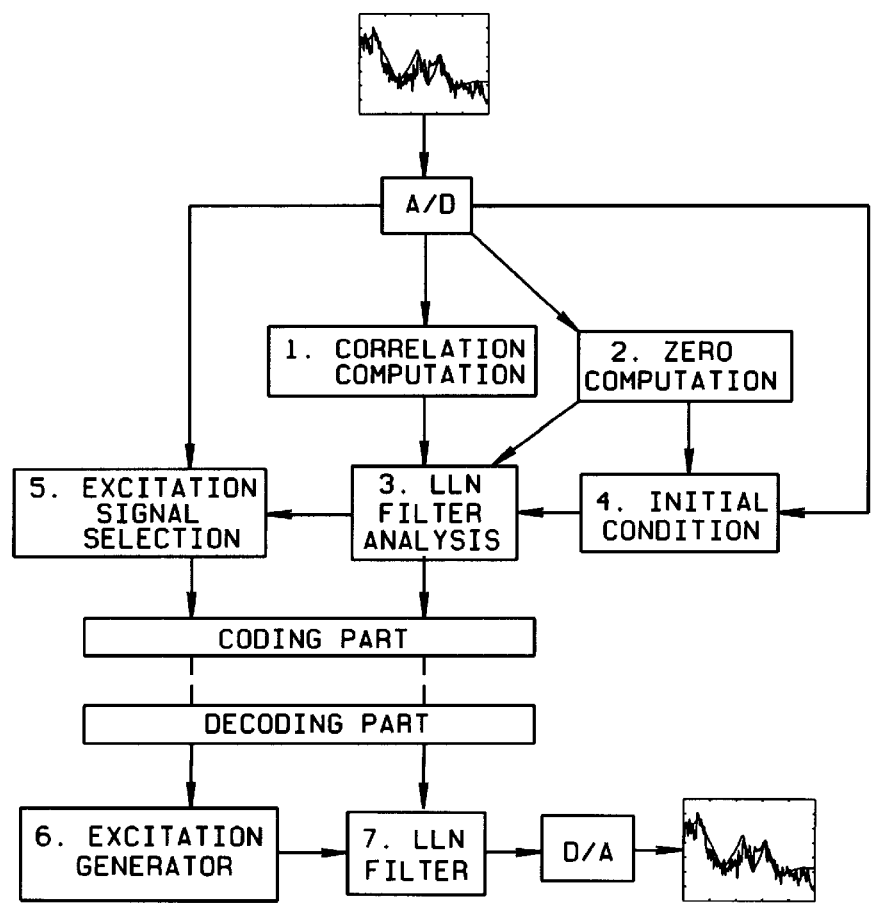
FIG. 5 is a schematic diagram of a speech coder comprising a speech analyzer portion and a speech synthesis portion.

FIG. 5 illustrates a possible speech coding environment of the invention. Each box in this flow chart represents an algorithm or computation which can be found in existing software packages or hardware. Disclosed below is the inventors' best implementation of such algorithms.

The block diagram in FIG. 5 consists of two parts. The top part is the transmitter (analyzer), which computes the filter parameters, gain, and choice of excitation model as explained below. These parameters are coded, in the usual manner, and transmitted to the receiver (synthesizer) and decoded. The receiver consists of an excitation generator providing the appropriate input to the LNN filter (see FIG. 4), thus set with the appropriate parameters.

To improve the numerical properties of the filter computation the digitized signal may be passed through a pre-emphasis filter to reduce the dynamical range of the speech spectrum (see, Barnwell III et al., *Speech Coding: A Computer Laboratory Textbook,* supra, at 86–87). To compensate for this, the inverse filter (deemphasis filter) is placed at the output of the LNN filter. To simplify matters, in FIG. 5, these filters are included in the A/D and D/A blocks, respectively, which themselves may be omitted if the source and result are desired to be digital signals.

Determination of the Covariance Coefficients

Box 1 determines the covariance sequence $c_0, c_1, \ldots, c_n$ from the digital waveform and is standard practice using ordinary skill in the art. For example, the Autocorrelation Method can be used (see, Barnwell III et al., *Speech Coding: A Computer Laboratory Textbook,* supra, at 91–93). Also, U.S. Pat. No. 4,775,951 discloses a device for computing correlation functions and coefficients.

Determination of the Transmission Zeros

Box 2 determines the filter zeros from the digital waveform, if in fact the zeros have not been prescribed as part of the application specs. There are several alternatives for systematically choosing the zeros. First disclosed is the recursive algorithm which is believed to represent the best available state of the-art.

It is desired to determine the set of desired transmission zeros, $\zeta_1, \zeta_2, \ldots, \zeta_n$. In fact, for present purposes it is actually needed to determine the corresponding zero polynomial $$B(z):=(z-\zeta_1)(z-\zeta_2) \ldots (z-\zeta_n)=z^n+b_1z^{n-1}+ \ldots +b_n. \quad (2.6)$$

So that the resulting filter will be implementable, the zeros are restricted to be self-conjugate, i.e., so that for each i there exists a j so that $\zeta_j=\bar{\zeta}_i$, where the bar represents complex conjugation. Consequently, the coefficients $b_i$ of the zero polynomial B(z) are all real numbers.

It is the standard practice, when using an all-pole filter to use additional poles in order to compensate for the lack of zeros (see, Rabiner et al., *Digital Processing of Speech Signals,* supra, especially at Section 3.4.1, p. 99). The present method is based on the capability of using an LLN filter of lower order than would be required by the LPC filter and taking advantage of the availability of additional auto-correlation data to determine the zero structure by standard systems and signal processing algorithms.

Using the Autocorrelation Method (see, Barnwell III et al., *Speech Coding: A Computer Laboratory Textbook,* supra, at 91–93), or some version of Burg's algorithm as taught in B. Porat, *Digital Processing of Random Signals,* Prentice Hall, 1994, at 176, first compute the reflection coefficients $$\gamma_{m+1-n}, \gamma_{m+2-n}, \ldots, \gamma_{m+n}$$

for some $m \geq n$, i.e., the PARCOR coefficients succeeding those used in the LPC filter, and then solve the Toeplitz system $$\begin{bmatrix} \gamma_m & \gamma_{m-1} & \cdots & \gamma_{m+1-n} \\ \gamma_{m+1} & \gamma_m & \cdots & \gamma_{m+2-n} \\ \vdots & \vdots & \ddots & \vdots \\ \gamma_{m+n-1} & \gamma_{m+n-2} & \cdots & \gamma_m \end{bmatrix} \begin{bmatrix} \sigma_1 \\ \sigma_2 \\ \vdots \\ \sigma_n \end{bmatrix} = - \begin{bmatrix} \gamma_{m+1} \\ \gamma_{m+2} \\ \vdots \\ \gamma_{m+n} \end{bmatrix}, \quad (2.7)$$

for the parameters $\sigma_1, \sigma_2, \ldots, \sigma_n$. If the polynomial $$\sigma(z)=z^n+\sigma_1z^{n-1}+ \ldots +\sigma_n,$$

has all its roots inside the unit disc, simply set $B(z)=\sigma(z)$. More generally, take B(z) to be the stable spectral factor of $Q(z):=\sigma(z)\sigma(z^{-1})$, computed as in Appendix A and normalized so that the leading coefficient (of $z^n$) is 1.

Alternative methods can be based on any of the procedures described in Markel et al., *Linear Prediction of Speech,* supra, at 271–75, including Prony's method with constant term. As pointed out above, these methods are not by themselves good for producing synthetic speech, because they do not satisfy (2.1)–(2.2). However, here only the zero computation is used, and in Box 3 the poles are determined to satisfy (2.1)–(2.2). As another alternative, the choice of zeros can also be done by determining the phase of the zeros from the notches in the observed spectrum, as represented by a periodogram or as computed using Fast Fourier Transforms (FFT), by any standard algorithm for determining local minima.

Coding of the LLN Filter Parameters

The key in the present algorithm is to be able to systematically determine the gain parameters (2.5) to match the observed covariance data and to have prescribed transmission zeros. This is done in Box 3.

As a result of the basic theory developed in C. I. Byrnes and A. Lindquist, *An Algebraic Description of the Rational Solutions of the Covariance Extension Problem,* Linear Circuits, Systems and Signal Processing, C. I. Byrnes, C. F. Martin and R. E. Saeks (editors), Elsevier 1988, 9–17; C. I.

Byrnes and A. Lindquist, *On the Geometry of the Kimura-Georgiou Parameterization of Modeling Filter,* Inter. J. of Control 50 (1989), 2301–2312; C. I. Byrnes and A. Lindquist, *Toward a Solution of the Minimal Partial Stochastic Realization Problem,* Comptes Rendus Acad. Sci. Paris, t. 319, Série I (1994), 1231–1236; C. I. Byrnes and A. Lindquist, *Some Recent Advances on the Rational Covariance Extension Problem,* Proc. IEEE European Workshop on Computer Intensive Methods in Control and Signal Processing, Prague 1994, 149–158; C. I. Byrnes and A. Lindquist, *On the Partial Stochastic Realization Problem,* IEEE Trans. Automatic Control AC-42 (1997); C. I. Byrnes, A. Lindquist, and T. McGregor, *Predictability and Unpredictability in Kalman Filtering,* IEEE Transactions Auto. Control AC-36 (1991), 563–579; C. I. Byrnes, A. Lindquist, and Y. Zhou, *Stable, Unstable and Center Manifolds for Fast Filtering Algorithms,* Modeling, Estimation and Control of Systems with Uncertainty (G. B. Di Masi, A. Gombani, and A. Kurzhanski, eds.), Birkhauser Boston Inc., 1991; and C. I. Byrnes, A. Lindquist, and Y. Zhou, *On the Nonlinear Dynamics of Fast Filtering Algorithms,* SIAM J. Control and Optimization, 32 (1994), 744–789, and culminating in Byrnes et al., *A Complete Parameterization of All Positive Rational Extensions of a Covariance Sequence,* supra, at 1841–1857; C. I. Byrnes, A. Lindquist, S. V. Gusev and A. V. Matveev, *The Geometry of Positive Real Functions with Applications to the Rational Covariance Extension Problem,* Proc. 33rd Conf. On Decision and Control, 3883–3888; C. I. Byrnes and A. Lindquist, *On a Duality Between Filtering and Interpolation,* Systems and Control in the 21st Century (C. I. Byrnes, B. N. Datta, D. Gilliam, C. F. Martin, eds.) 101–136; C. I. Byrnes, H. J. Landau and A. Lindquist, *On the Well-Posedness of the Rational Covariance Extension Problem,* Current and Future Directions in Applied Mathematics, M. Alber, B. Hu and J. Rosenthal (editors), Birkhäuser Boston, 1997, 83–108; and C. I. Byrnes, S. V. Gusev and A. Lindquist, *A Convex Optimization Approach to the Rational Covariance Extension Problem,* it is known that for any window of correlation coefficients, as above, and any preselection of transmission zeros, there exists one and only one linear filter having both desired zero structure and the standard statistical features required to regenerate the observed random signal. The present invention comprises a method for systematically designing the specified parameters for the linear filter which achieves this. The basis for this systematic design method, and the resulting device, is the discovery that the filter parameters can indeed be obtained from a standard kind of optimization procedure, applied to a formulation of the problem the inventors have discovered and now disclose.

There are two sets of inputs to Box 3, the covariance coefficients $c_0, c_1, \ldots, c_n$, delivered by Box 1, and the set of transmission zeros (2.6), delivered by Box 2 and collected in the polynomial B(z). The third input from Box 4 may or may not be present, as explained below. Defining $\phi$ to be the objective function $$\varphi(q_0, q_1, \ldots, q_n) = \qquad (2.8)$$
$$c_0 q_0 + c_1 q_1 + \cdots + c_n q_n - \frac{1}{2\pi} \int_{-\pi}^{\pi} |B(e^{j\theta})|^2 \log Q(e^{j\theta}) d\theta,$$

in the n+1 variables $q_0, q_1, \ldots, q_n$, where $$Q(z) = q_0 + \tfrac{1}{2} q_1(z + z^{-1}) + \tfrac{1}{2} q_2(z^2 + z^{-2}) + \ldots + \tfrac{1}{2} q_n(z^n + z^{-n}), \qquad (2.9)$$

and log is the natural logarithm, minimize the objective function (2.8) over all choice of variables $(q_0, q_1, \ldots, q_n)$ such that $$Q(e^{j\theta}) > 0 \text{ for all } \theta \in [-\pi, \pi]. \qquad (2.10)$$

The present invention shows that there is a unique such minimum. Given the minimizing $(q_0, q_1, \ldots, q_n)$ and the corresponding pseudo polynomial (2.9), next determine the stable polynomial $$A(z) = a_0 z^n + a_1 z^{n-1} + \ldots + a_n \qquad (2.11)$$

satisfying $$A(z)A(z^{-1}) = Q(z), \qquad (2.12)$$

which can be done by any of the procedures described in Appendix A. Then the present invention shows that the transfer function $$w(z) = \frac{1}{2} \frac{B(z)}{A(z)} \qquad (2.13)$$

satisfies the specifications (i) and (ii) for an LLN filter. Finally, determine the gain parameters (2.5) in the following way:

For $k = n, n-1, \ldots, 1$, solve the recursions $$\begin{cases} a_{k-1,j} = a_{kj} + \alpha_{k-1} a_{k,k-j}, \ a_{nj} = a_j \\ \alpha_{k-1} = -\dfrac{a_{kk}}{a_{k0}} \\ b_{k-1,j} = b_{kj} - \beta_k a_{k,k-j}, \ b_{nj} = b_j \\ \beta_k = \dfrac{b_{kk}}{a_{k0}} \end{cases} \qquad (2.14)$$

For $j = 0, 1, \ldots, k$, and set $\beta_o = +b_{oo}/a_{oo}$.

Passing from the parameterization (2.13) to the parameterization (2.14) is a well-known procedure (see, e.g. K. J. Åström, *Introduction to Stochastic Realization Theory,* Academic Press, 1970; and K. J. Åström, *Evaluation of Quadratic Loss Functions for Linear Systems,* Fundamentals of Discrete-time systems: A Tribute to Professor Eliahu I. Jury, M. Jamshidi, M. Mansour, and B. D. O. Anderson (editors), IITSI Press, Albuquerque, N.M., 1993, 45–56). This algorithm is recursive, using only ordinary arithmetic operations, and can be implemented with an MAC mathematics processing chip using ordinary skill in the art.

The minimization of (2.8) given the constraints (2.10) is a convex optimization problem for which there are many standard algorithms and software that determine the minimizing $(q_0, q_1, \ldots, q_n)$ recursively. Most generic codes for convex optimization will compute the gradient (first derivative) and/or Hessian (second derivative) for use in a recursive algorithm, such as defined, for example, by Newton's method. However, for the specific problem of minimizing $\phi$, both the gradient and the Hessian can be computed directly, without computing the values of the function (2.8), using the computation of the covariances of an associated process and using Fourier transforms. While the covariance data are well known to be computable using just recursive algorithms employing only ordinary arithmetic operations (see, Porat, *Digital Processing of Random Signals,* supra, especially at 175–177), we disclose here that the computation of the Fourier coefficients can be computed using recursive algorithms employing only ordinary arithmetic operations. For this reason, a direct application of Newton's method with the computations of the gradient and Hessian described below gives an algorithm believed to be the best state of the art. The resulting recursive minimization algorithm, using only arithmetic operations, has been encoded in MATLAB and can be implemented with an MAC mathematics processing chip using ordinary skill in the art.

More precisely, the gradient is given by $$\frac{\partial \varphi}{\partial q_k}(q_0, q_1, \ldots, q_n) = c_k - \bar{c}_k \qquad (2.15)$$

where $$\bar{c}_k = \frac{1}{2\pi} \int_{-\pi}^{\pi} e^{jk\theta} \frac{|B(e^{j\theta})|^2}{Q(e^{j\theta})} d\theta \quad \text{for } k = 0, 1, 2, \ldots, n \qquad (2.16)$$

are the covariances corresponding to a process with spectral density $$\frac{|B(e^{j\theta})|^2}{Q(e^{j\theta})} = \bar{c}_0 + 2\sum_{k=1}^{\infty} \bar{c}_k \cos(k\theta). \qquad (2.17)$$

The gradient is thus the difference between the given partial covariance sequence and the partial covariance sequence corresponding to the choice of variables $q_0, q_1, \ldots, q_n$ at which the gradient is calculated. The minimum is attained when this difference is zero. The covariances $\bar{c}_0, \bar{c}_1, \ldots, \bar{c}_n$ can be determined, via ordinary arithmetic operations, by first performing the factorization (2.12) by one of the procedures disclosed in Appendix A and then applying the procedure described in Appendix B to A(z).

To implement Newton's method, the Hessian of (2.8) is also needed, i.e., the matrix function of second derivatives of (2.8), i.e., $$H_{ij}(q_0, q_1, \ldots, q_n) = \frac{1}{2}(h_{i+j} + h_{i-j}) \; i, j = 0, 1, 2, \ldots, n \qquad (2.18)$$

where $$h_k = \frac{1}{2\pi} \int_{-\pi}^{\pi} e^{jk\theta} \frac{|B(e^{j\theta})|^2}{Q(e^{j\theta})^2} d\theta \quad \text{for } k = 0, 1, 2, \ldots, 2n \qquad (2.19)$$

and $h_{-k} = h_k$. Moreover, $h_0, h_1, \ldots, h_{2n}$ are the 2n+1 first Fourier coefficients of the spectral representation $$\frac{|B(e^{j\theta})|^2}{Q(e^{j\theta})^2} = h_0 + 2\sum_{k=1}^{\infty} h_k \cos(k\theta), \qquad (2.20)$$

so, in the same way as above, the procedure of Appendix B can be used to compute $h_0, h_1, \ldots, h_{2n}$. Since the Hessian is the sum of a Toeplitz matrix and a Hankel matrix, the search direction at the point $q_0, q_1, \ldots, q_n$, i.e., $$d := H^{-1}(\bar{c} - c) \qquad (2.21)$$

(where c and $\bar{c}$ are the n+1 vectors with components $c_0, c_1, \ldots, c_n$ and $\bar{c}_0, \bar{c}_1, \ldots, \bar{c}_n$ respectively) can then be determined directly or via a fast algorithm (see, G. Heinig, P. Jankowski and K. Rost, *Fast Inversion Algorithms of Toeplitz-plus-Hankel Matrices*, Numerische Mathematik 52 (1988), 665–82).

In fact, Newton's method amounts to recursively updating the vector q with components $q_0, q_1, \ldots, q_n$ according to the rule $$q^{k+1} = q^k + \lambda_k d^k, \qquad (2.22)$$

where $d^k$ is the search direction (2.21) at the point $q^k$ (see, e.g., M. Minoux, *Mathematical Programming: Theory and Algorithms*, John Wiley and Sons, New York, 1986, at 94–95). Here the step size $\lambda_k$ is chosen so that (i) $q^{k+1}$ satisfies the constraints (2.10), (ii) Wolf's Test (see, D. G. Luenberger, *Linear and Nonlinear Programming* (Second Edition), Addison-Wesley Publishing Company, Reading, Mass., 1984 at 214.), which amounts to checking that $$(c - \bar{c}^{k+1})' d^k \geq (1-\delta)(c - \bar{c}^k)' d^k$$

is fulfilled for some specified $0 < \delta < \frac{1}{2}$, where $\bar{c}^k$ denotes $\bar{c}$ in step k and ' denotes transpose,
where test (ii) is optional. Take $\lambda_k = 1$ as long as these conditions are satisfied; otherwise successively take half as long a step until conditions (i) and (ii) are satisfied. Test (2.10) in a preselected number of points on the interval $[-\pi, \pi]$ and/or through the positivity test performed in conjunction with determining $\bar{c}$ (see Appendix A). The initial point $q^0$ can be obtained via $$|A^0(e^{j\theta})|^2 = q_0^0 + q_1^0 \cos\theta + q_2^0 \cos 2\theta + \ldots + q_n^0 \cos n\theta, \qquad (2.23)$$

where $A^0(z)$ is an arbitrary stable polynomial. For $A^0(z)$ one could choose the polynomial A(z) obtained by the LPC (maximum entropy) procedure, i.e., the Szegö polynomial, generated by the Levinson-Durbin algorithm (see, e.g., Byrnes et al., *A Complete Parameterization of All Positive Rational Extensions of a Covariance Sequence*, supra, at 1843–44; and Porat, *Digital Processing of Random Signals*, supra, at 159) and appropriately normalized by $(r_n)^{-1/2}$ in the terminology of Byrnes et al., *A Complete Parameterization of All Positive Rational Extensions of a Covariance Sequence*, supra. However, the preferred procedure is to determine the initial condition $A^0(z)$ by a procedure described below. This is done in Box 4.

Figure 6:
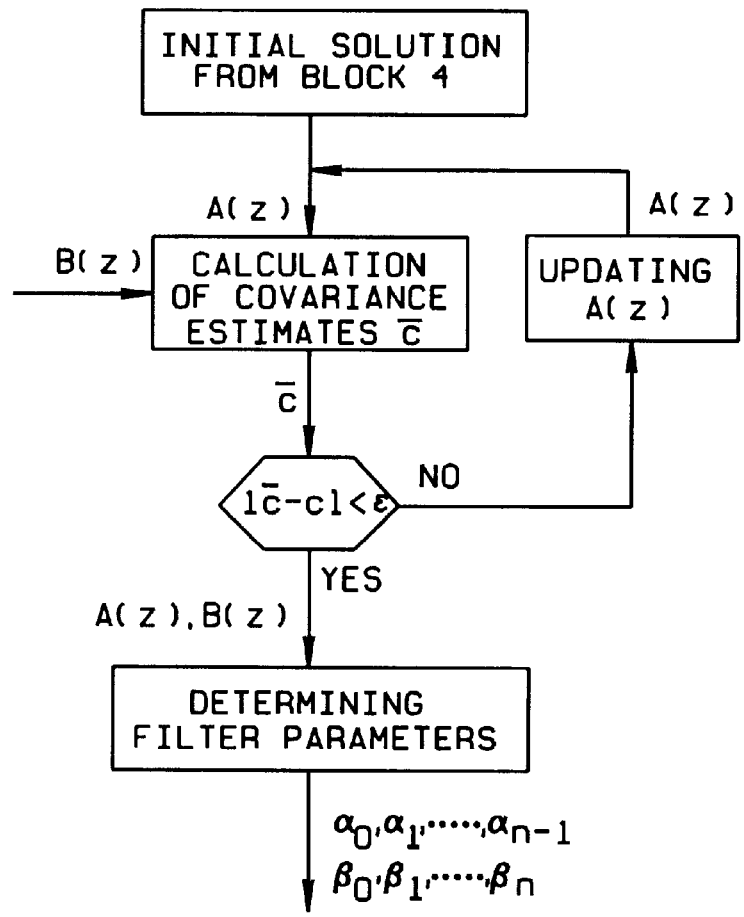
FIG. 6 is a block diagram, or flow chart, of the mathematical process required to determine the LLN filter parameters.

Given c from Box 1 and B(z) from Box 2, the preferred recursive selection method in Box 3 is described in the flow chart of FIG. 6.

Starting with the initial pole polynomial, in each step first determine the vector c with components $c_0, c_1, \ldots, c_n$ via (2.17) in the manner described above, taking $Q(e^{j\theta}) = |A(e^{j\theta})|^2$; see Appendix B. Next, test whether the current approximation c of the partial covariance sequence c is within the tolerance $\epsilon$ of c. If it is not, continue the recursive algorithm by updating A(z). If it is, terminate the recursive steps and determine the filter parameters (2.5) via the recursions (2.14). The updating is performed by taking a Newton step (2.22) as described above, computed from the present A(z) by setting $Q(e^{j\theta}) := |A(e^{j\theta})|^2$. The updated A(z) polynomial is obtained by factoring the pseudo polynomial $Q^{k+1}(z)$ corresponding to the updated point $q^{k+1}$ by the procedures of Appendix A, thereby also checking that condition (i) is fulfilled.

Determining the Initial Condition

In Box 4, we determine, from the speech data, the initial condition for the algorithm in Box 3. An obvious choice would be the pole polynomial produced using a standard LPC filter design procedure. The preferred initialization procedure is to form the signal $x_0, x_1, x_2,...$ from the speech signal $y_0, y_1, y_2, \ldots$ and the given zero polynomial (2.6) via the recursion $$b_0 x_{t+n} + b_1 x_{t+n-1} + \ldots + b_n x_t = y_{t+n} \qquad (2.24)$$

by setting $x_t = 0$ for $t < 0$, then to compute the sample covariances $$d_k = \frac{1}{N-k} \sum_{t=k}^{N-1} x_t x_{t-k} \quad k = 0, 1, 2, \ldots, n, \qquad (2.25)$$

and finally take the initial $A(z)$ to be the LPC pole polynomial corresponding to the x signal, computed as above but with $c_0, c_1, \ldots, c_n$ exchanged for $d_0, d_1, \ldots, d_n$.

Another good alternative procedure is obtained by running the fast algorithm disclosed in Byrnes et al., *On the Nonlinear Dynamics of Fast Filtering Algorithms*, supra, backwards, using the PARCOR coefficients $$\gamma_0, \gamma_1, \ldots, \gamma_{m+n-1}$$

for some $m \geq n$, determined from the speech data as described above. For $k = 0, 1, 2, \ldots, m$, determine $$G_k = \begin{bmatrix} 1 - \gamma_{k+n-1}^2 & -\gamma_{k+n-1}\gamma_{k+n-2} & -\gamma_{k+n-1}\gamma_{k+n-3} & \cdots & -\gamma_{k+n-1}\gamma_k \\ 0 & 1 - \gamma_{k+n-2}^2 & -\gamma_{k+n-2}\gamma_{k+n-3} & \cdots & -\gamma_{k+n-2}\gamma_k \\ 0 & 0 & 1 - \gamma_{k+n-3}^2 & \cdots & -\gamma_{k+n-3}\gamma_k \\ \vdots & \vdots & \vdots & & \vdots \\ 0 & 0 & 0 & \cdots & 1 - \gamma_k^2 \end{bmatrix}$$

and, given the zero polynomial (2.6), compute $$\begin{bmatrix} x_1 \\ x_2 \\ \vdots \\ x_n \end{bmatrix} = G_0 G_1 G_2 \ldots G_m \begin{bmatrix} b_1 \\ b_2 \\ \vdots \\ b_n \end{bmatrix}.$$

Next determine the Szegö polynomials $\phi_1(z), \phi_2(z), \ldots, \phi_n(z)$ via the Levinson algorithm (see, e.g., Byrnes et al., *A Complete Parameterization of All Positive Rational Extensions of a Covariance Sequence*, supra, at 1843) and determine $g_o$ by the procedure of Appendix B applied to $$A(z) = \phi_n(z) + x_1 \phi_{n-1}(z) + \ldots + x_n.$$

Then, the polynomial $$A^0(z) = \sqrt{\frac{g_0}{c_0}} (\varphi_n(z) + x_1 \varphi_{n-1}(z) + \cdots + x_n)$$

can be used as an initial condition.

Finally, one could also use any of the pole estimates discussed in Markel et. al, *Linear Prediction of Speech*, supra, at 271–275, such as, for example, the one obtained via Prony's method. (Prony's method is not good enough for a final solution but could be used for an initial value.)

Excitation Signal Selection

The output of Box 5 is the choice of an excitation signal, drawn from a class of model signals, which when used to excite the LLN filter will best regenerate the observed signal. The design of the LLN filter is not a vocoder design, but rather a technology which can be used in a broad class of speech analysis and synthesis architectures. Various vocoder schemes employ various kinds of excitation signal selections schemes, based on a variety of classes of model signals. For example, for a pitch-excited vocoder, the excitation signal selection consist of a decision, for each speech frame, whether the sound is voiced or unvoiced, and for voiced frames, the determination of a pitch period. Pitch detection is standard in the art (see Barnwell III et al., *Speech Coding: A Computer Laboratory Textbook*, supra, at 101 for discussion and further references). As another example for the CELP vocoder approach to analysis-by-synthesis, the excitation signal generator tests which signal from a code book of (typically) 1024 (or 10 bit) codewords produces a synthetic output which best matches the speech signal when passed through the LPC filter. Such selection procedures are standard in the art (see, e.g., Barnwell III et al., *Speech Coding: A Computer Laboratory Textbook*, supra, at 101 and 129–32; W. B. Kleijn, D. J. Krasinski and R. H. Ketchum, *Fast Methods for the CELP Speech Coding Algorithm*, IEEE Trans. Acoustics, Speech, and Signal Processing 38 (1990) at 1330–32; and *TR45 Full-Rate Speech Codec Computability Standard PN-2972*, Electronic Industries Association, 2001 Eye Street, N.W., Washington, D.C. 20006, 1990 at 22–32) when applied to LPC filters and can also be implemented for general digital filters, including, for example, LLN filters.

In summary, in the speech analyzer disclosed herein, any of these excitation signal selector would perform the same determination of the best signal, using an LLN filter in lieu of the use of an LPC filter.

The Excitation Generator

Figure 7:
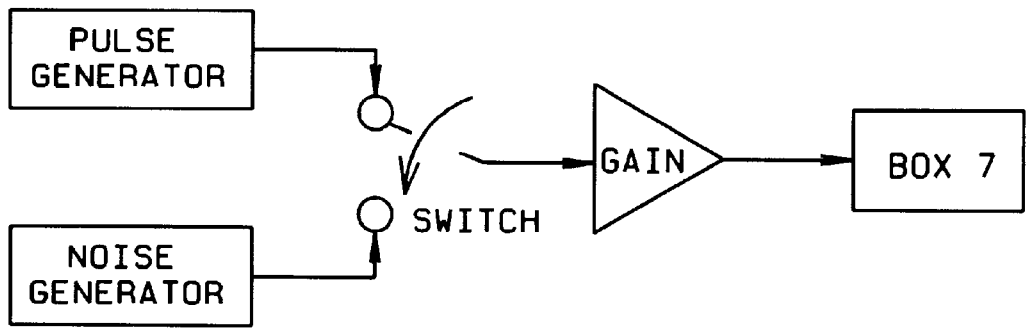
FIG. 7 is a schematic diagram of an excitation generator for a pitch-excited vocoder.

Just as various speech analysis schemes employ various kinds of excitation signal selection methodologies, for speech synthesis each vocoder employs an excitation generator based on its speech analysis methodology. In the speech synthesizer disclosed herein, any of these excitation generators would perform the same regeneration when interfaced with an LLN filter, in lieu of an LPC filter interconnection. For the purposes of illustration, we describe the mechanisms of the excitation generator for an LLN filter employed in a pitch-excited vocoder. The pitch and voicing information of Box 5, the gain and the identification of the excitation signal selected in Box 5 are all coded and transmitted to the receiver where they are decoded and constitute the input to Box 6, as illustrated in FIG. 7.

Here there is a switch which is set to either voiced or unvoiced sound, according to the information obtained from Box 5. If the sound is voiced, a pulse train with the pitch period determined in Box 5 is produced, and, if the sound is unvoiced, white noise is produced. The signal thus produced is passed through a gain, the setting for which is obtained from Box 5, and delivered as an input to the LNN filter of Box 7. The purpose of the gain setting is to control the amplitude of excitation signal and thus the loudness of the synthetic speech (see, Barnwell III et al., *Speech Coding: A Computer Laboratory Textbook*, supra, at 87–88). The arrangement of these circuit elements, but not the design and implementation of the present invention, is standard in the art.

The LNN Filter

The LLN parameters determined in Box 3 are coded and transmitted to the receiver where they are decoded. The LNN filter of Box 7 is depicted in FIG. 4, where the parameters (2.5) are those transmitted from Box 3, and where the input is that produced in Box 6. The output of Box 7 is digital synthetic speech which may be transformed to an analogue speech signal by a D/A converter, after having gone through a de-emphasis filter, if needed.

As can be appreciated by those skilled in the art, the present invention may be readily implemented in a microprocessor(s) suitably programmed to perform the indicated calculations. Furthermore, references have been made above and throughout for all of the processing steps to existing software or programmable hardware to fully and completely implement the present invention. The present invention may also be implemented on custom designed chips, or otherwise using presently known design and implementation techniques for microelectronic circuitry for hardware or software implementation. As such, the present invention should not be limited to any particular hardware or software implementation and instead may be implemented in a variety of formats to suit the particular application thereof.

The foregoing disclosure has been provided as illustrative of the preferred embodiment as contemplated by the inventors and should not be considered as limiting. Instead, the scope of the invention should only be that as provided by the claims appended hereto, and their equivalents.

Appendix A. Factorization Subroutine

A subroutine used repeatedly above is to find the stable polynomial (2.11) satisfying (2.12) for a given pseudo polynomial (2.9). This is a standard factorization problem for which there are many known procedures (see, e.g., F. L. Bauer, *Ein direktes Iterationsverfahren zur Hurwitz-Zerlegung eines Polynoms,* Arch. Elek. Ubertragung, 9 (1955), 285–290). We believe the method described in Vostrŷ, Zdeněk, *New Algorithm for Polynomial Spectral Factorization with Quadratic Convergence I,* Kybernetika, 77 (1975), 411–418) is the best available art. We also disclose another factorization algorithm which also yields a positivity test. M-files software in MATLAB have been developed. This algorithm is recursive, using only ordinary arithmetic operations, and can be implemented with an MAC mathematics processing chip using ordinary skill in the art.

For the sake of brevity, the algorithm is described by referring to equations in Byrnes et al., *A Complete Parameterization of All Positive Rational Extensions of a Covariance Sequence,* supra. First solve the Levinson algorithm (equation 2.9 in the Byrnes et al. article) merely exchanging $c_0, c_1, \ldots, c_n$ for $q_0, q_1, \ldots, q_n$, thus obtaining the reflection coefficients $\gamma_0, \gamma_1, \ldots, \gamma_{n-1}$ from (equation 2.7 in the Byrnes et al. article) and the Szegö polynomials $\phi_1(z), \phi_2(z), \ldots, \phi_n(z)$ from (equation 2.9 in the Byrnes et al. article). Next, determine the coefficients $\alpha_1, \alpha_2, \ldots, \alpha_n$ an such that $$\phi_n(z) + \alpha_1 \phi_{n-1} + \ldots + \alpha_n = z^n,$$

which amounts to solving a triangular linear system of equations. Using the vectors a and y, with components $\alpha_1, \alpha_2, \ldots, \alpha_n$ and $\gamma_0, \gamma_1, \ldots, \gamma_{n-1}$ respectively as initial conditions, the fast algorithm (equation 2.17 in the Byrnes et al. article) converges to a limit as $t \to \infty$, provided the positivity condition (2.10) holds. In particular, $\alpha_k(t) \to \sigma_k$ for $k=1, 2, \ldots, n$. Then $$A(z) = \alpha_0(z^n + \sigma_1 z^{n-1} + \ldots + \sigma_n), \quad (A.1)$$

where $$a_0 = \sqrt{\frac{d_0}{1 + \sigma_1^2 + \cdots + \sigma_n^2}} \quad (A.2)$$

is the required polynomial spectral factor. Moreover, setting $\gamma_k(t) = \gamma_{t+k}$, $$|\gamma_t| < 1 \text{ for } t=0,1,2,\ldots \quad (A.3)$$

is a test for positivity, i.e., that (2.10) holds.

Appendix B. Covariance Computation Subroutine

This section describes how to determine the coefficients $g_0, g_1, \ldots, g_n$ in the expansion $$\frac{|B(e^{j\theta})|^2}{|A(e^{j\theta})|^2} = g_0 + 2\sum_{k=1}^{\infty} g_k \cos(k\theta) \quad (B.1)$$

for any (stable) polynomials (2.6).and (2.11).

Begin by determining the coefficients $f_0, f_1, \ldots, f_{2n}$ in the expansion $$\frac{1}{|A(e^{j\theta})|^2} = f_0 + 2\sum_{k=1}^{\infty} f_k \cos(k\theta)$$

corresponding to a LPC filter. This is done by first applying the inverse Levinson algorithm (see B. Porat, *Digital Processing of Random Signals,* supra, at 165 and 47) to A(z) for computing the reflection coefficients, and then the inverse Schur algorithm (see, B. Porat, *Digital Processing of Random Signals,* supra, at 166) for computing $f_0, f_1, \ldots, f_{2n}$ and then the recursion $$f_{n+k} = -\sum_{i=0}^{k-1} \frac{a_i}{a_0} f_{n-i+1}$$

to find $f_{n+1}, f_{n+2}, \ldots, f_{2n}$. Finally, the coefficients $g_0, g_1, \ldots, g_n$ are obtained from $$g_j = p_0 f_j + \sum_{i=1}^{m} p_i (f_{|i-j|} + f_{i+j})$$

where $p_0, p_1, \ldots, p_n$ are the coefficients in $$B(z)B(z^{-1}) = p_0 + p_1(z+z^{-1}) + \ldots + p_n(z^n + z^{-n}).$$

Consequently, the covariance coefficients $g_0, g_1, \ldots, g_n$ can be computed using just recursive algorithms and ordinary arithmetic operations.

What is claimed is:

1. A speech analyzer for speech segmented into a plurality of speech frames comprising: means for determining filter zeros and covariances from a speech frame, and means for calculating a set of gains for an LLN filter which match said filter zeros and covariances so that as said LLN filter is excited by a selected signal said speech frame is regenerated.

2. The speech analyzer of claim 1 wherein said calculating means includes means for computing a set of filter parameters from the filter zeros and filter covariances.

3. The speech analyzer of claim 2 further comprising a signal selector for determining said excitation signal.

4. The speech analyzer of claim 3 further comprising means for determining whether said speech frame is voiced or unvoiced.

5. The speech analyzer of claim 2 wherein said calculating means includes means for optimizing an objective function which incorporates the filter zeros and filter covariances.

6. The speech analyzer of claim 5 further comprising means for determining an initial condition for said set of gains for said LLN filter.

7. The speech analyzer of claim 6 wherein said optimizing means includes means for using only algorithms which are defined solely in terms of arithmetic operations.

8. The speech analyzer of claim 2 further comprising a speech synthesizer in communication with said speech analyzer, said speech synthesizer including a programmable LLN filter, and an excitation generator connected to said LLN filter for generating said selected signal so that as said programmable filter is configured in accordance with said calculated set of gains, said speech frame is regenerated by said selected signal.

9. The speech analyzer of claim 8 wherein said speech synthesizer is remote from said speech analyzer and further comprising a telecommunications data link therebetween.

10. The speech analyzer of claim 8 wherein said excitation generator includes means for producing signals corresponding to either voiced or unvoiced speech.

11. The speech analyzer of claim 8 wherein said excitation generator includes a look up table having a plurality of entries and a corresponding code for each of said table entries so that said speech analyzer need only determine and specify a look up table entry to thereby specify a desired signal.

12. The speech analyzer of claim 11 wherein said speech analyzer further comprises means for determining a look up table entry corresponding to a signal which most closely produces the speech frame when used to excite the LLN filter.

13. The speech analyzer of claim 1 further comprising a signal selector for determining said excitation signal.

14. The speech analyzer of claim 13 further comprising means for determining whether said speech frame is voiced or unvoiced.

15. The speech analyzer of claim 1 wherein said calculating means includes means for optimizing an. objective function which incorporates the filter zeros and filter covariances.

16. The speech analyzer of claim 1 further comprising means for determining an initial condition for said set of gains for said LLN filter.

17. The speech analyzer of claim 1 wherein said optimizing means includes means for using only algorithms which are defined solely in terms of arithmetic operations.

18. A speech synthesizer having a programmable LLN filter, and an excitation generator for generating a pre-selected signal for exciting said LLN filter to thereby regenerate a desired frame of speech.

19. The speech synthesizer of claim 18 further comprising a telemetry link for receiving a set of filter parameters for programming said LLN filter and a code indicative of a desired excitation signal.

20. The speech synthesizer of claim 18 further comprising means for programming said LLN filter in response to said received filter parameters and wherein said excitation generator is responsive to said code.

21. The speech synthesizer of claim 20 further comprising a D/A converter for converting the output of said LLN filter to an analog waveform.

22. A method for analyzing a frame of speech comprising the steps of: determining a set of filter zeros and covariances from said speech frame, and calculating therefrom a set of filter parameters comprising a set of gains for an LLN filter which match said filter zeros and covariances so that as said LLN filter is excited by a preselected signal said speech frame is regenerated.

23. The method of claim 22 wherein the calculating step includes the step of computing a set of filter poles from the filter zeros and covariances.

24. The method of claim 23 wherein the calculating step further includes the step of optimizing an objective function which incorporates the filter zeros and covariances.

25. The method of claim 24 further comprising the step of determining an initial condition for said set of gains for said LLN filter.

26. The method of claim 25 wherein the optimizing step includes the step of using only algorithms which are defined solely in terms of arithmetic operations.

27. The method of claim 23 further comprising the step of determining a desired signal for exciting said LLN filter to regenerate said speech frame.

28. The method of claim 22 further comprising the step of transmitting the filter parameters and a code corresponding to the desired excitation signal to a speech synthesizer for regeneration of said speech frame.

29. A method for regenerating a frame of speech comprising the steps of: programming a programmable LLN filter, generating a pre-selected signal for exciting said LLN filter, and exciting said LLN filter with said generated signal to thereby regenerate said frame of speech.

30. The method of claim 29 further comprising the steps of receiving a set of filter parameters for programming said LLN filter, programming said LLN filter in accordance therewith, and receiving a code indicative of said generated signal.

31. The method of claim 30 further comprising the step of converting the output of said LLN filter to an analog waveform.

32. A speech analyzer including a circuit for detecting a frame of speech, and a translator of converting said speech frame into a set of LLN filter parameters, said LLN filter parameters being suitable for reproduction of said speech frame through excitation of an LLN filter configured with said filter parameters.

* * * * *